April 22, 1958 — W. STERN — 2,831,605
AUXILIARY HOPPER DEVICE
Filed Aug. 6, 1953 — 2 Sheets-Sheet 1

INVENTOR.
William Stern
BY Olson & Trexler
attys.

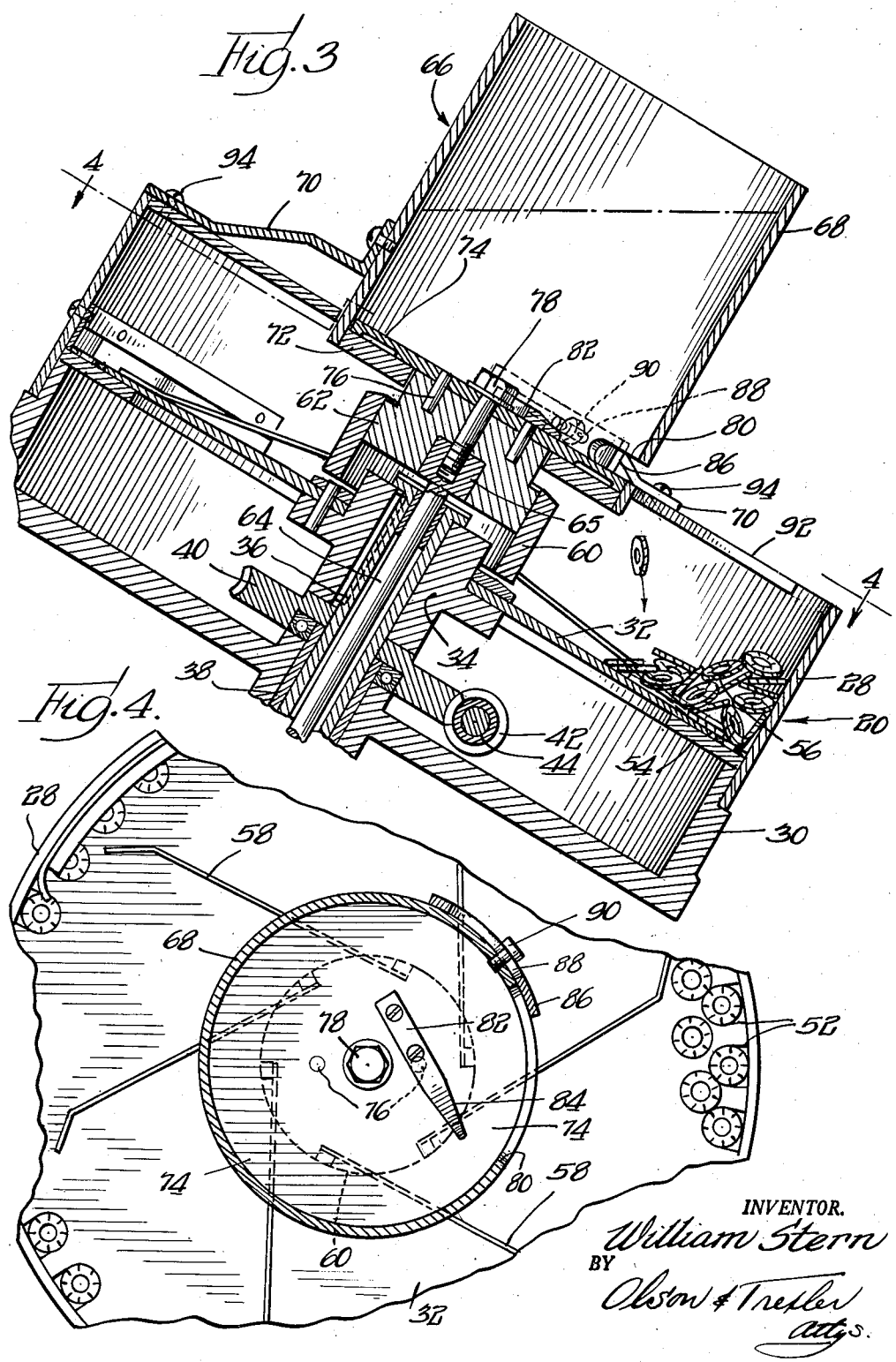

United States Patent Office 2,831,605
Patented Apr. 22, 1958

2,831,605

AUXILIARY HOPPER DEVICE

William Stern, Park Ridge, Ill., assignor to Illinois Tool Works, Chicago, Ill., a corporation of Illinois Application August 6, 1953, Serial No. 372,751

3 Claims. (Cl. 221—174)

The present invention relates to a novel apparatus for containing a supply of washers and like articles and feeding the washers to a work station.

There are many instances where it is desirable to feed washers or similar articles from a supply hopper to a work or assembly station. For example, machines have been devised for assembling washers with screw elements, which machines include a hopper for containing a supply of washers and means for separating washers from the supply thereof and delivering the separated washers to the assembly station. One device that has been used to good advantage for separating and feeding washers from a supply hopper includes a rotatable disk providing the bottom of the hopper, which disk has a plurality of pockets or slots therein adapted to receive a single washer for conveyance to the work station. While such washer separating and feeding devices have been generally satisfactory, it has been found that they operate most efficiently when the supply of washers in the hopper is kept relatively low and substantially constant. However, in order to accomplish this, it has been necessary for the operator of the machine to fill the hopper at frequent intervals, and this is especially true in certain machines which operate at rapid rates so as to deliver up to 800 washers per minute to the assembly station. It is, therefore, an object of the present invention to overcome these disadvantages of the prior are machines by providing a novel apparatus for maintaining a supply of washers and the like in the feed hopper to give the most efficient results for substantial periods of time.

More specifically, it is an object of the present invention to provide an apparatus of the above described type with novel auxiliary hopper means capable of retaining a substantial supply of washers and like articles and of delivering such articles continuously and in a controlled manner to the main feed hopper, thereby to maintain a substantially constant supply of the articles in said main feed hopper.

Still another object of the present invention is to provide an auxiliary hopper of the above described type which is of simple and economical construction and which may be readily attached to existing machines without requiring additional driving means cooperating with the delivery mechanism of the auxiliary hopper.

Other objects and advantages of the present invention will become apparent from the following description and the accompanying drawings, wherein:

Fig. 3 is an enlarged fragmentary cross sectional view taken along line 3—3 in Fig. 2; and Fig. 4 is a fragmentary cross sectional view taken along line 4—4 in Fig. 3.

Figure 1:
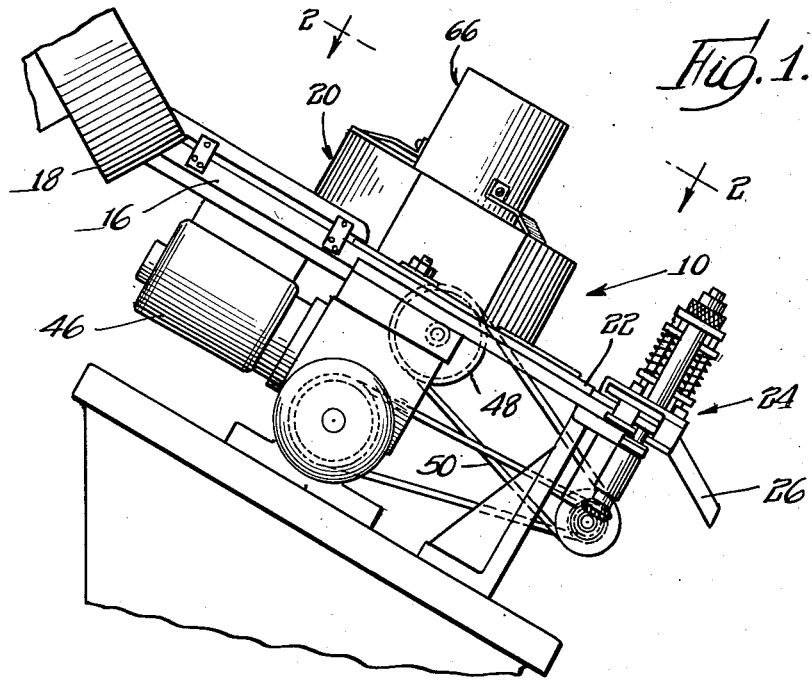
Fig. 1 is a side elevational view illustrating an apparatus embodying the principles of this invention.

Referring now more specifically to the drawings, wherein like parts are designated by the same numerals throughout the various figures, the novel features of this invention are illustrated as embodied in a machine 10 for assembling washers with screws or nuts. Since the present invention relates primarily to the hopper structure only such hopper structure need be described in detail. In general, the machine 10 includes a work or assembly station 12 having a rotatable turret 14 adapted to receive and position washers and either screws or nuts for assembly with each other. The screws or nuts are fed along a suitable track 16 to the turret from a hopper 18, and the washers are fed to the turret from a main hopper 20 described more fully hereinbelow. The assembled elements leave the turret 14 and travel down a track or guideway 22 to a staking device generally indicated by the numeral 24 and thence down a discharge chute 26.

Figure 2:
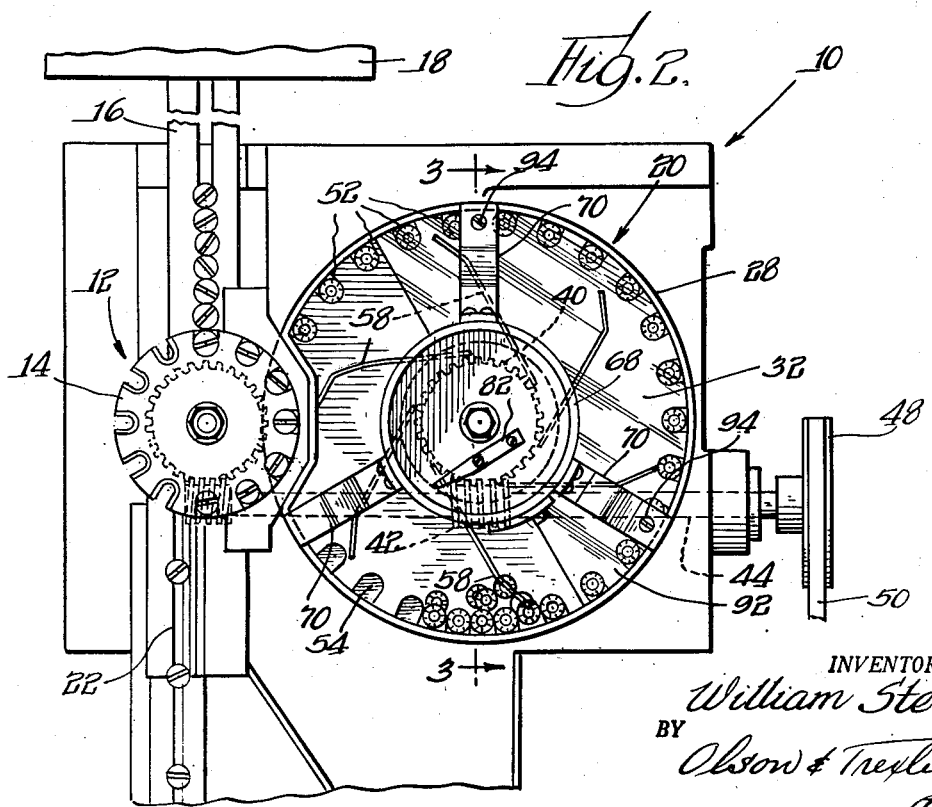
Fig. 2 is a plan view of the apparatus taken along line 2—2 in Fig. 1.

Referring now to Fig. 3, it is seen that the main feed hopper 20 includes an annularly disposed wall 28 mounted on a housing member 30 and secured thereto by any suitable means, not shown. The housing member is in turn mounted on the frame of the machine 10 by suitable means, not shown. The bottom of the hopper 20 is provided by a rotatable disk 32 secured to a hub 34, which hub in turn is fixed to a hollow rotatable drive shaft 36. The shaft 36 is journaled in the housing 30 by a suitable bearing 38. In order to drive the shaft 36, and thus rotate the disk 32, a worm gear 40 is secured to the shaft for meshing engagement with a worm 42 mounted on a drive shaft 44 (see Fig. 2). The shaft 44 may be driven in any suitable manner, such as by an electric motor 46, mounted on the machine base and connected with the drive shaft by suitable means including a pulley 48 and drive belt 50. As shown best in Figs. 2 and 4, the rotatable disk 32 is provided with a plurality of slots or pockets 52 spaced around the peripheral margin thereof for receiving washers and conveying the washers to the assembly station. A ring 54 is disposed around the hopper and beneath the peripheral margin of disk 32 to prevent washers from falling through the pockets or slots 52.

As shown best in Figs. 1 and 3, the machine, and thus the hopper 20, are mounted so that they are inclined at an acuate angle to the horizontal. This causes a supply 56 of washers to slide toward the lower side of the hopper, as shown in Fig. 3. Thus, upon rotation of the disk 32, the washers which fall into the slots 52 become separated from the supply or mass of washers in the hopper and are conveyed to the turret 14 at the assembly station. In order to maintain the mass or supply of washers in a loosened condition so as to facilitate the positioning of individual washers in the slots or pockets 52, a plurality of flexible arms 58 are mounted for rotation around the hopper to agitate and loosen the mass of washers in the hopper. These arms are secured to a sleeve 60 which in turn is fixed to a cap member 62 mounted on a rotatable shaft 64 extending through hollow shaft 36. The shaft 64 is preferably provided with an enlarged head 65 to prevent downward axial displacement thereof. Any suitable drive means, not shown, may be provided between the shaft 64 and the electric motor for rotating the shaft. However, preferably means are provided for driving the shaft 64, and hence the fingers 58, in a direction opposite to the direction of rotation of the separating and feeding disk 32.

It has been found that if the mass or supply 56 of washers in the hopper 20 is too great, the washers will not be efficiently separated from the mass by the disk 32 so that the over-all efficiency of the assembly machine will be reduced. Furthermore, if an operator were initially to provide a supply in the hopper 20, which supply would permit most efficient operation, it would then be necessary for the operator to be constantly refilling the hopper. Therefore, in accordance with the present invention, an auxiliary hopper unit 66 has been provided for maintaining a constant supply of washers in the hopper 20 for substantial periods of time without overloading the hopper 20. This auxiliary hopper includes an upstanding tubular shell 68 concentrically arranged with respect to the hopper 20 and supported from the upper edge of the hopper 20 by means of a plurality of simple brackets 70. An annular bearing-like member 72 is secured within the shell 68 at its lower end for cooperating with the above described cap member 62 to maintain the shell 68 in axial alignment with the main hopper 20.

Means is provided for discharging washers or other articles from the auxiliary hopper 66 in a controlled manner to maintain the desired supply in the main hopper. This means includes a rotatable disk 74 which forms the bottom of the auxiliary hopper. The disk 74 is secured to the cap member 62 by pins 76, and the disk, cap member and shaft 64 are retained together by a sccrew 78. With this structure, it will be seen that the rotatable disk of the auxiliary hopper is driven by the means already provided for driving the flexible fingers 58 and is driven in the same direction as the fingers 58.

The tubular shell 68 of the auxiliary housing is provided with an elongated discharge slot or opening 80 through which washers and the like may be ejected into the main hopper 20. A wiper finger 82 is secured to the rotatable disk 74 by suitable screws or the like for directing washers through the outlet opening 80. As shown best in Fig. 4, the wiper finger 82 is offset from the center of the disk 74 in order to obtain more efficient sweeping action for directing the washers out of the opening 80. Preferably, the sides and top of the leading end 84 of the sweeper finger are tapered in the manner illustrated in Figs. 3 and 4 to prevent undue jamming of the washers. While the rotatable disk 74 and the sweeper finger thereon are normally driven at a constant speed, the rate of washer discharge may be easily controlled by means of a simple gate 86 secured to the outer surface of the tubular shell 68 and adapted to close at least partially the opening 80. The gate 86 is preferably provided with an elongated slot 88 therein and is secured to the tubular shell by a screw 90 so that upon loosening of the screw, the gate may be adjusted to increase or decrease the size of the discharge opening 80 and thereby control the rate of washer discharge from the auxiliary hopper.

As shown clearly in Fig. 3, the auxiliary hopper discharge opening 80 is preferably located in the lower side of the hopper so that washers and like articles are directed toward the mass or supply 56 of washers in the main hopper which normally congregate at the lower side of the main hopper. It is understood that with the hopper 66 filled to the level of the broken line in Fig. 3, the washer supply in hopper 20 may be maintained for considerable periods of time. Because of the continuing agitation of the supply of washers in the main hopper by the disk 32 and spring fingers 58, some of the washers in this supply which are being directed toward the supply from the auxiliary hopper may tend to fly out of the main hopper. Therefore, a covering shield 92 is provided over a portion of the main hopper, which shield may be conveniently supported by means of screws 94 extending through the auxiliary hopper supporting brackets 70. Preferably, this shield is made from a clear plastic material so that the operator may easily observe the action taking place within the main hopper and whether or not the supply of washers is being properly maintained in the main hopper.

From the above description, it is seen that the present invention has provided a novel apparatus for efficiently feeding washers to a work or assembly station for considerable periods of time without requiring constant refilling of a hopper by the operator. More specifically, it is seen that the present invention has provided a novel auxiliary hopper which is adapted to contain a substantial supply of washers and like articles and eject such washers into a main feed hopper in a manner so as to insure constant and efficient operation of the main feed hoppr. In addition, it is seen that the novel auxiliary hopper mechanism of this invention is of simple construction and may be easily attached to an existing apparatus and, furthermore, may be operated by the drive mechanism of the existing apparatus.

While the preferred embodiment of the present invention has been shown and described herein, it is obvious that many structural details may be changed without departing from the spirit and scope of the appended claims.

The invention is claimed as follows:

1. An apparatus for feeding articles such as washers and the like to a work station, comprising fixed hopper means inclined at an angle from the vertical for containing in a lowermost bottom side portion thereof a supply of articles in a pile with numerous articles disposed at random on top of and adjacent to other articles, means providing at least a portion of the bottom of said hopper means and rotatable about an axis inclined at said angle from the vertical for separating articles one at a time from said pile of articles and for successively advancing the separated articles from said pile to the work station, a stationary auxiliary hopper disposed above said hopper means and at said angle from the vertical and adapted to contain an additional supply of articles, means providing said auxiliary hopper with a stationary discharge opening in a lower margin of an upstanding side wall thereof facing generally toward said lowermost portion of the hopper means, and means at the bottom of said auxiliary hopper rotatable about said axis for positively ejecting articles from the auxiliary hopper through said opening and into said hopper means.

2. An apparatus, as defined in claim 1, wherein said rotatable ejecting means includes a rotatable disk providing at least a portion of the bottom of said auxiliary hopper, and wiper finger means secured to said disk and disposed substantially tangentially to a circle concentric with said disk for promoting sweeping action of the wiper means.

3. An apparatus, as defined in claim 1, wherein said discharge opening is elongated circumferentially of said auxiliary hopper side wall, said apparatus including means for continuously rotating said rotatable ejecting means, and said auxiliary hopper including gate means for varying the effective circumferential length of said discharge opening to control the rate of discharge of articles from the auxiliary hopper into said hopper means.

References Cited in the file of this patent

UNITED STATES PATENTS

| 611,302 | Weiss | Sept. 27, 1898 |
| 1,385,086 | Maranville | July 19, 1921 |
| 2,273,782 | Irwin | Feb. 17, 1942 |
| 2,354,717 | Treciokas | Aug. 1, 1944 |
| 2,361,948 | Krueger | Nov. 7, 1944 |

FOREIGN PATENTS

| 64,528 | Switzerland | June 18, 1913 |